United States Patent [19]
Bott

[11] Patent Number: 4,619,137
[45] Date of Patent: Oct. 28, 1986

[54] ARRANGEMENT OF A PRESSURE-MEASURING ELEMENT

[75] Inventor: Helmuth Bott, Pforzheim, Fed. Rep. of Germany

[73] Assignee: Dr. Ing. h.c.F. Porsche, Aktiengesellschaft, Fed. Rep. of Germany

[21] Appl. No.: 737,436

[22] Filed: May 24, 1985

[30] Foreign Application Priority Data

May 26, 1984 [DE] Fed. Rep. of Germany ....... 3419820

[51] Int. Cl.[4] .............................................. B60C 23/04
[52] U.S. Cl. ................ 73/146.5; 301/6 WB; 340/58
[58] Field of Search ................ 73/146.5, 146.3, 146.4, 73/146.2; 301/6 WB; 340/58

[56] References Cited
U.S. PATENT DOCUMENTS

| 2,071,256 | 2/1937 | Dobbs | 340/58 |
| 3,832,681 | 8/1974 | Kaida | 73/146.5 |

FOREIGN PATENT DOCUMENTS

| 2351549 | 4/1975 | Fed. Rep. of Germany | 73/146.5 |
| 0036113 | 3/1980 | Japan | 73/146.5 |

Primary Examiner—Donald O. Woodiel
Attorney, Agent, or Firm—Barnes & Thornburg

[57] ABSTRACT

An arrangement of a pressure-measuring element for an air pressure control system in a vehicle, in which the measuring element is acted upon by air pressure in the tire hollow space and cooperates with a pick-up fixed at the axle. The pressure-measuring element is coordinated to an air chamber provided on the side of the rim which is in communication with the tire hollow space by way of at least one air flow passage.

1 Claim, 5 Drawing Figures

ARRANGEMENT OF A PRESSURE-MEASURING ELEMENT

The present invention relates to an arrangement of a pressure-measuring element for an air pressure control system on a vehicle wheel, in which the measuring element is acted upon by air pressure in the hollow space of the tire and cooperates with a transducer or pick-up fixed on the axle.

A known air pressure control system includes essentially a pressure-measuring element built into the rim, which faces an HF-transducer or pick-up fixedly arranged at the axle for the measurement during each wheel rotation. The pressure-measuring element is arranged in the rim well or rim base and is acted upon directly by the air pressure in the hollow space of the tire. It terminates in the tire hollow space flush with the inner surface of the rim well or base in order that no impairment can occur when mounting the vehicle tire. The outwardly disposed part of the measuring element, in contrast, projects from the outer rim surface and there exists the possibility in a disadvantageous manner that the measuring element may be damaged by an external influence such as, for example, by jamming or impacting stones, ice lumps and the like, respectively, is pulled out of its fixed position in the rim or pressed into the rim. As a result of this damage, the measuring element is displaced so far in the threaded seat, respectively, angled out of its seat that the thread is damaged, air escapes out of the tire hollow space and the tire becomes defective which, in any event, impairs the safety of the vehicle.

It is the object of the present invention to provide an arrangement for a pressure-measuring element of a tire air pressure control system in a vehicle wheel which is arranged protected against an external mechanical damage.

The underlying problems are solved according to the present invention in that the pressure-measuring element is coordinated to an air chamber provided on the side of the rim which is in communication with the hollow space of the tire by at least one air through-flow opening.

The advantages achieved principally with the present invention reside in that the pressure-measuring element according to the present invention is held in the rim in such a manner that a mechanical damaging and canting by external influences is precluded. For that purpose the measuring element is coordinated to a separate air chamber which is connected with the hollow space of the tire by at least one air through-flow opening. The measuring element can be arranged thereby projecting into the air chamber and externally flush with the surface of the rim well or base so that damages acting externally against projecting areas of the measuring element are effectively precluded.

The air chambers are, as illustrated in the embodiments, provided on the side of the rim within the area of the wheel dish and, depending on the type of rim, are correspondingly integrated into the same without necessitating additional relocations or displacements of components such as brake, guide members, etc. The air chambers are formed by corresponding inner chamber walls which are securely connected with the rim.

In rims in which hollow spaces are already provided in the hollow spokes of a cast wheel owing to the type of construction, one of the hollow spaces is utilized as air chamber for the accommodation of the pressure-measuring element.

Additionally, a disadvantageous influencing of a diaphragm provided in the measuring element, which is acted upon by the tire air pressure, by centrifugal forces is most far-reachingly avoided by the arrangement of the pressure-measuring element, preferably in the vertical wheel plane.

These and other objects, features and advantages of the present invention will become more apparent from the following description when taken in connection with the accompanying drawings which shows, for purposes of illustration only, several embodiments in accordance with the present invention and wherein.

Figure 4:
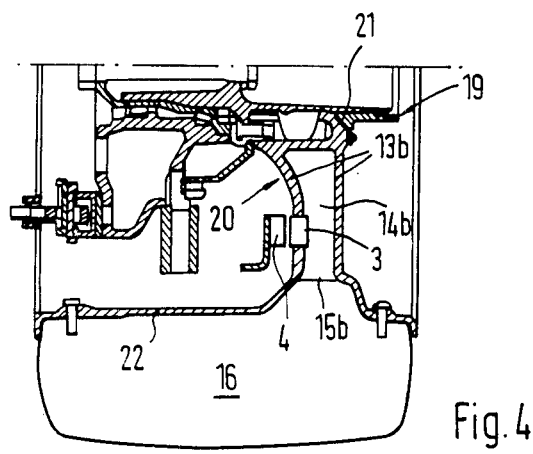
Figure 5:
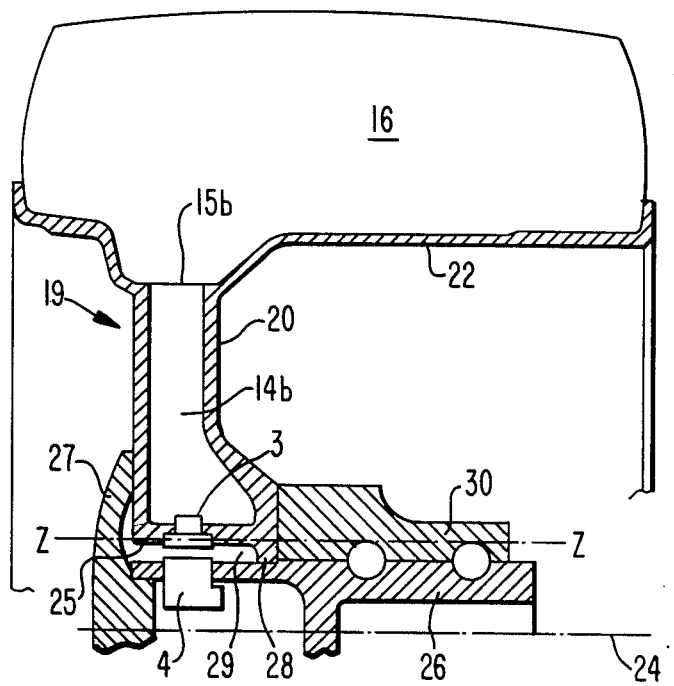

FIG. 4 is a partial cross-sectional view through a still further embodiment of a cast wheel with hollow spokes for the arrangement of a pressure-measuring element in accordance with the present invention; and FIG. 5 is a partial cross-sectional view through still another embodiment of a vehicle wheel with a measuring unit in accordance with the present invention for a driven or non-driven axle arranged between the hub and the rim.

Figure 1:
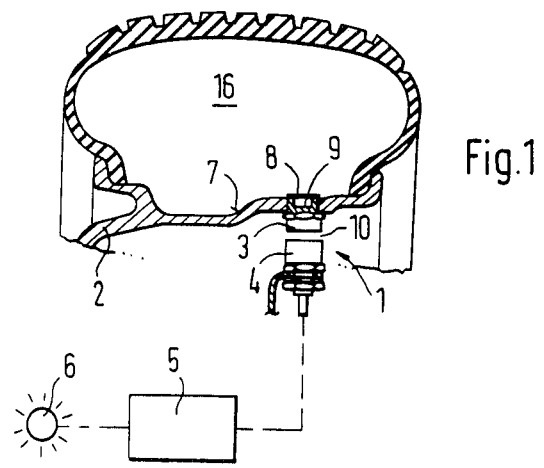
FIG. 1 is a partial cross-sectional view through a vehicle wheel with an arrangement of the tire air pressure control system, indicated schematically, according to the state of the art.

Referring now to the drawing wherein like reference numerals are used throughout the various views to designate like parts, the air pressure control system generally designated by reference numeral 1 according to the prior art (FIG. 1) essentially includes a pressure-measuring element 3 built into the rim 2 and projecting externally, a locally fixedly arranged pick-up or transducer 4, an electronic evaluating device 5 as well as an indicator 6. The pressure-measuring element 3 terminates flush with the rim inner side 7 and includes on the inside a diaphragm 8 which is pressed by the air pressure in the tire hollow space 16 against the comparison pressure of a gas volume enclosed in a chamber 9 as reference volume. The diaphragm 8 is always in an equilibrium position with a correct tire pressure. If the ratio of tire pressure to comparison pressure changes as a result of air loss in the tire, then the diaphragm 8 is being displaced and interrupts an electronic resonant circuit integrated into the pressure-measuring element 3. The latter dampens the transducer or pick-up 4 by way of an air gap 10. The "passing" accepter circuit produces during each wheel rotation a pulse in the pick-up or transducer 4 as long as the pressure-measuring element 3 is closed. The pulses are fed to the evaluating electronics 5. With a tire pressure loss, the pulse sequence produced in the pick-up or transducer 4 is interrupted which is recognized by the electronic evaluating device 5 as tire defect and will be so indicated by indicator 6.

Figure 2:
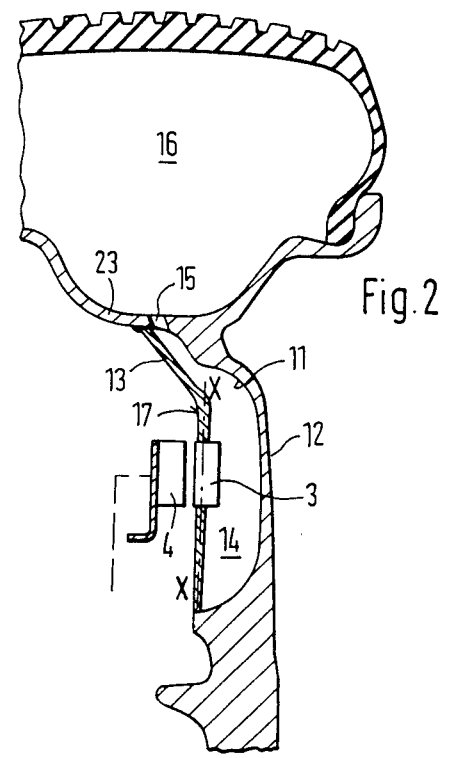
FIG. 2 is a partial cross-sectional view through one embodiment of a vehicle wheel with an air chamber arranged on the side of the rim in accordance with the present invention.

As shown more clearly in FIG. 2, an air chamber 14 is formed by a recess 11 on the inside of the wheel dish 12 and by an additional chamber wall 13. This air chamber 14 is connected with the tire hollow space 16 by way of one or several air passage openings 15. The pressure-measuring element 3 which is retained in the chamber wall 13, terminates externally preferably flush with the wall surface 17. The transducer or pick-up 4 is arranged disposed opposite during each wheel rotation. The chamber wall 13 is connected with the rim body by a suitable connecting method such as bonding, welding, brazing or the like.

Figure 3:
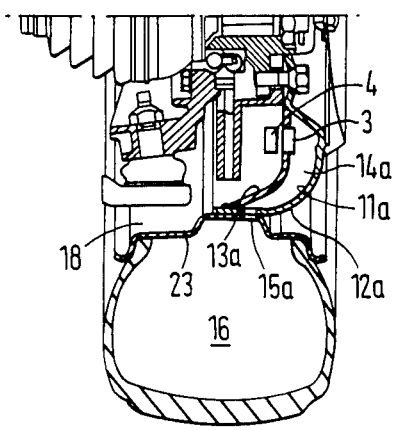
FIG. 3 is a partial cross-sectional view through a further embodiment of a vehicle wheel with an air chamber inside of the wheel disk in accordance with the present invention.

According to a further embodiment according to FIG. 3, with a rim 18 formed of sheet metal parts, an air chamber 14a is also formed by a formed-out part 11a in the rim dish 12a. This formed-out part 11a forms the air chamber 14a by encapsulation by means of a chamber wall 13a. A connection to the tire hollow space 16 takes place by way of an air flow opening 15a.

The openings 15, respectively 15a, connect the two hollow spaces 14 and 16, respectively, 14a and 16 directly with one another and, for that purpose, are provided directly within the area of the wheel base 23. However, it would also be possible to provide a connection of the two hollow spaces by way of a hose, a line, a duct, a channel or a similar connection, especially if the hollow spaces are not directly adjacent one another and abut directly at one another.

In the embodiment according to FIGS. 2 and 3, the pressure-measuring element is arranged in a vertical plane X—X as illustrated, preferably in the respective wall 13 or 13a. The pressure element 3 could also be arranged in a horizontal plane by means of a chamber wall which extends partially in the horizontal plane which is not illustrated in detail.

According to the embodiment of FIG. 4, a cast wheel generally designated by reference numeral 19 is provided with spokes generally designated by reference numeral 20 which are constructed hollow and have an approximately circularly shaped cross section. They extend from a hub 21 to the rim well or base 22 and form with the same a cast-together unit. The hollow space inside of the spokes 20 forms an air chamber 14b which is tightly surrounded by a spoke wall 13b, whereby the air chamber 13e terminates directly in the tire hollow space 16 by way of an air passage opening 15b. The pressure-measuring element 3 is retained in the inwardly disposed spoke wall 13 inside of the wheel disk and terminates on the outside thereof flush with the same.

According to still another embodiment of the present invention according to FIG. 5, the pressure-measuring element 3 is arranged in a radial closure wall 25 extending approximately parallelly to the axis of rotation 24 of the wheel. The closure wall 25 extends in a horizontal plane Z—Z. This wall 25 closes off an air chamber 14b radially toward the inside. In the outward direction, the air chamber 14b terminates radially in the hollow space 16 of the tire. The transmitter 4 is held in the stationary hub 26 and is disposed opposite the measuring element 3 during each wheel rotation for producing a pulse. The lead-in of lines takes place by way of the hub 26. In order that the measuring elements 3 and 4 are protected against external influences such as water, ice, contaminations and the like, an external seal, such as, for example, a cap 27 and an internal seal in the manner of a formed-on portion 28 at the rim 19 are provided. These seals 27 and 28 close the annular space 29 at each end. In order that the rim is not damaged by the transmitter 4 when being placed over the hub 26 for fastening at the rotatable wheel hub 30, the transmitter is arranged either flush with the stationary hub 26 or the inner sealing element is constructed elastically, respectively has a corresponding recess.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An arrangement of a pressure-measuring element for an air pressure control system on a vehicle wheel having a rim, in which the measuring element is acted upon by air pressure in the hollow space of the tire and cooperates with a fixedly arranged pick-up means, an air chamber means provided on the rim side which is in communication with the tire hollow space by way of at least one air through-flow opening means, the pressure-measuring element being arranged in a closure wall of the air chamber means, said closure wall extending at least approximately parallelly with respect to one of fixed wheel hub and wheel axis of rotation, the pick-up means being held in the fixed wheel hub disposed opposite the measuring element, and an annular space separating the pick-up means from the measuring element, said annular space being closed-off between the stationary hub and the closure wall by way of an inner sealing means at the wheel and by way of a cap means adapted to be mounted from the outside.

* * * * *